Jan. 31, 1939.  J. BIJUR  2,145,245
CENTRAL LUBRICATION
Filed Sept. 30, 1932  3 Sheets-Sheet 1

INVENTOR
Joseph Bijur, deceased
by George Bijur, executor
BY
ATTORNEYS

Patented Jan. 31, 1939

2,145,245

UNITED STATES PATENT OFFICE 2,145,245

CENTRAL LUBRICATION

Joseph Bijur, deceased, late of New York, N. Y., by George Bijur, executor, New York, N. Y., assignor to Auto Research Corporation, a corporation of Delaware Application September 30, 1932, Serial No. 635,526

37 Claims. (Cl. 184—7)

The present invention relates primarily to lubrication, and more especially to lubrication from a single source of a multiplicity of separate and distinct bearings in a mechanism or bearing arrangement.

The invention is more especially concerned with automatic lubricating systems, that is, with systems in which the lubricant is delivered to or applied at the bearings as an incident to the driving actuation or operation of the mechanism or arrangement without the need for any special manipulation.

The invention has among its objects to provide a lubricating installation of the above type, easily applied to mechanisms or mechanical installations without involving material alterations thereof, and which will reliably deliver lubricant in accordance with the requirements of the various bearings or parts without deficiency or excessive overflow at any of said parts, substantially regardless of the complexity of the system or arrangement, or the number or location of the parts thereof requiring lubrication.

Another object is to provide a system of the above type which lends itself readily to the use of lubricant of any desired degree of viscosity and which permits the application of the source of lubricant or of pressure at any convenient place or location either near or remote from the lubricated mechanism or at a higher or lower level with respect thereto.

Another object is to provide a lubricating installation in which by relatively minor and simple adjustments and/or by the replacement of readily accessible elements a continuous or intermittent supply of lubricant may be obtained, and which may be most readily regulated to an intermittency of any predetermined period and to a lubricant supply greater or less than that for which the installation has been initially set.

Another object is to provide an automatic lubricating installation, which although it will supply the minute quantities of lubricant necessary for the bearings throughout the period of operation of the machine, may nevertheless be easily manipulated at any time without material disorganization and without substantial derangement to give an increased supply of lubricant in order to enable testing of the lubricating installation and/or in order to assure excess supply of lubricant at certain periods during the operation of the machinery, as when it is started operating after a shut-down.

Another object is to provide a pressure supply for a lubricating installation of the character described, which readily adapts itself to complicated automatic industrial machinery, and which is particularly adapted to be placed in any convenient crevice, pocket or opening in said machinery, which may be utilized as a lubricant reservoir.

In a preferred application, a lubricant delivery pipe extends from the source of lubricant along various parts of the mechanism or installation and has branches or taps leading into the various bearings, so that lubricant is applied thereto in parallel under the influence of pressure applied to the head of the line.

Appropriate control elements are provided in the various branches each constructed and arranged to assure the delivery of the desired quantity or proportion of lubricant to the corresponding bearing while pressure is applied at the head of the pipe line.

In the embodiment shown and to be described, the pump is illustratively of a rotary or gear type, driven directly from the source of power, but having its inlet and its outlet both normally connected directly into a lubricant reservoir. As a result the pump is normally operated to circulate the lubricant back into the reservoir. Control means preferably operated from a speed reducing transmission, periodically effects closure of the pump return to the tank, during a predetermined period, during which period the driven rotary pump will deliver and apply pressure to the pipe line.

A feature of the present invention resides in the provision of a special flow controlling outlet feeding back to the lubricant source connected in parallel with the other flow controlling outlets supplying the bearings, and preferably closely associated with the pump. This outlet is preferably so arranged that it is readily accessible for adjustment and may be regulated to increase or decrease the lubricant pressure on and the supply to the outlets associated with the bearings. The adjustable outlet may be readily utilized to regulate the pressure to assure a predetermined rate of feed with changing lubricant viscosity and with changing lubricant quality. On the other hand it may be also conveniently regulated to compensate for the increase or decrease in the number of flow controlling outlets.

Another feature resides in the provision of an independent manually actuated arrangement for controlling the unrestricted outlet or return of the pump into the reservoir to close the same and to cause the pump to exert full pressure at any desired period upon the distributing system, as upon initiation of the machine to give the bearings an initial shot of lubricant or at any subsequent time to test the lubricating installation or any particular flow proportioning outlet thereof.

In the accompanying drawings,

Fig. 3 is a top view of the lubricant pressure source partly in section, Figs. 4, 5, and 6 are side sectional views upon the lines 4—4, 5—5 and 6—6 of Fig. 3, and Figs. 7 and 8 are fragmentary transverse sectional views upon the lines 7—7 and 8—8 of Fig. 6.

Figure 1:
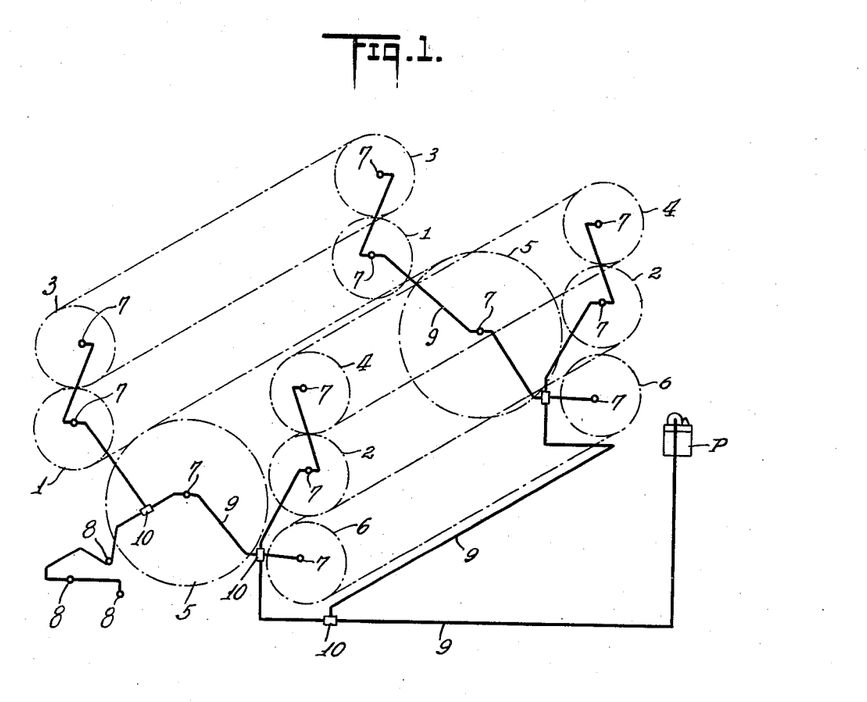
Fig. 1 is a diagrammatic view showing specific application of the invention to the lubrication of one type of industrial machinery, namely, a printing press.

In Fig. 1 is diagrammatically shown a typical installation as applied to a two color rotary printing press having a cylinder size of about 19 inches, a floor space of 26′, 6″ x 12′ 3″ with a height of 6′ and a shipping weight of about 70,000 pounds.

This printing press as diagrammatically shown is provided with plate cylinders 1 and 2, with impression cylinders 3 and 4, with transfer cylinders 5 and with delivery cylinders 6.

The showing of the printing press has been simplified to better show the lubricating installation and in this simplified showing the cylinders referred to are shown out of proper position.

Figure 2:
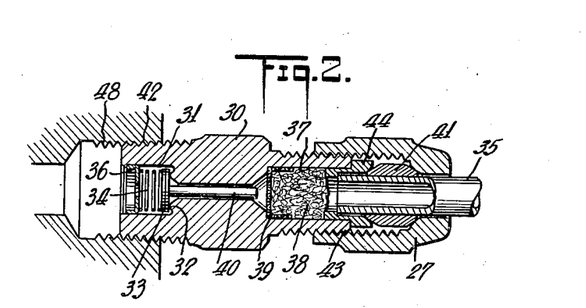
Fig. 2 is a longitudinal sectional view of one form of a flow proportioning outlet which may be employed.

In the outer printing press construction, of which Fig. 1 is a diagrammatic showing, the transfer cylinders 5 may be in contact with the impression and plate cylinders, although this is not shown in Fig. 1. According to the showing of Fig. 1, the paper is first passed between the plate and impression cylinders 1 and 3 and then is carried by the transfer cylinder 5 from this printing couple 1—3 to the other printing couple 2—4 including the plate cylinder 2 and the impression cylinder 4. After passing through the rollers 4 and 2 the printed sheet will be delivered by the delivery cylinder 6. To supply this press a plurality of flow control metering or proportioning outlets 7 and 8 are provided, each being designated by a small circle. These flow control outlets are supplied through the piping 9 and the junctions 10 from the central pump P which may be conveniently driven from some rotating shaft of the mechanism. The pump is shown in greater detail in Figs. 3 to 8, while one type of a flow control outlet is shown in Fig. 2. In the installation shown in Fig. 1, fifteen flow control outlets are employed. The distance from the pump P to the farthest outlet is 19′ and to the highest outlet is 4′. The distance from the pump to the lowest outlet is 18″.

The flow metering outlets 7 and 8 may be illustratively of the form shown in Fig. 2 and are desirably fitted into the sockets in or to socket carrying elements attached to the fixed elements of the bearings themselves. These outlets may comprise fittings 30 having sockets 31 at their outlet ends, the bottoms of which sockets are conformed as valve seats 32. These sockets 31 enclose flat disk valves 33, which may be pressed against their seats 32 by springs 34, said springs being retained in place by perforated caps 36. In the inlet socket 37 of the fitting is plugged a felt strainer 38 having a backing cup of wire mesh 39. In the longitudinal bore between the valve and the strainer is disposed a restriction pin 40. Preferably pins of different diameter and/or lengths are utilized in accordance with the desired ratings of the fittings, the longitudinal bores of the fittings being identical.

The drip plug is threaded as at its outlet end 42 for application to a tapped socket 48 in a bearing and also at its inlet end 43 for application thereto of a coupling for effecting a pipe connection. The pipe coupling may comprise a thimble 44 telescoped into the socket 38 and serving as a stop for the pipe end 35, and also a compression coupling sleeve 41 encircling the pipe end and forced against the thimble by the coupling cap 27 threaded upon the fitting.

Figure 5:
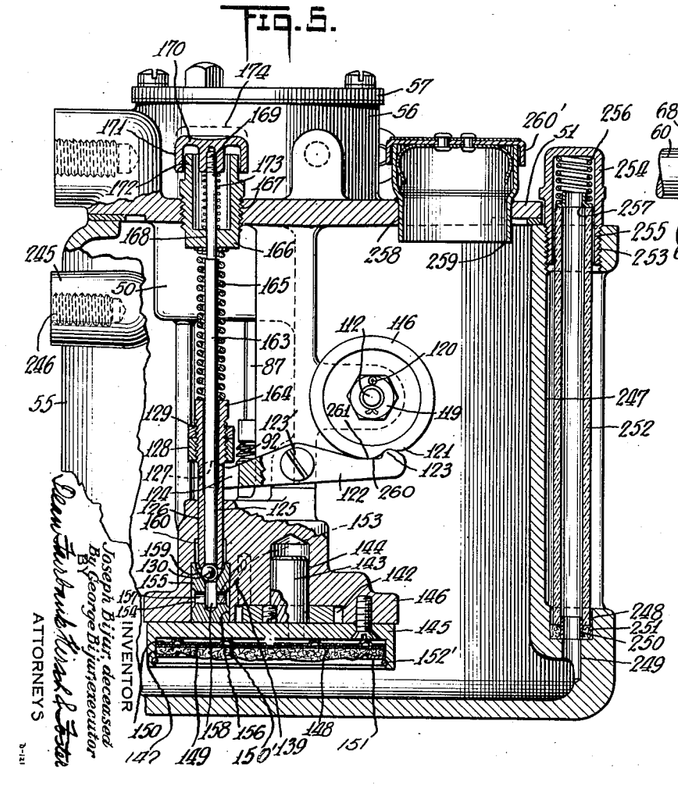

The central supply unit with which this invention is particularly concerned is shown in Fig. 5 as embodied in a metallic reservoir, but it is to be understood that the pump unit may be lifted out of the reservoir shown and inserted in any suitable crevice, pocket or depression in a machine structure, which will serve to hold the supply of lubricant and to supply the pump unit therewith.

The pump unit (see Figs. 3 to 6) is provided with a support 50 having a horizontal squared flanged cover portion 51, the vertices of which are provided with the openings 52 to receive attachment bolts. These bolts may serve to attach the pump unit to a reservoir 55, as shown (see particularly Fig. 5), or to any other structure which serves as a lubricant container. Upon the flanged cover 51 is positioned the cup 56 containing the spiral gears 58 and 59, and having a cover 57. The gear 58 is actuated by the shaft 60 from a suitable shaft or turning part of the machine to be lubricated, or if desired from an individual electric motor, preferably set into operation simultaneously with starting of the machine and stopped simultaneously with stopping of the machine.

The shaft 60 (see Figs. 3 and 6) passes through the neck 61 of the body 50 and has a collar 62 which fits in a depression or socket 63 in the outer flanged portion 64 of said neck 61. The bottom of the socket 63 is provided with a thrust washer 65 which contacts with the inner face of the collar 62 to take up the inward thrust of the shaft 60. The shoulder 66 on the shaft serves to locate the collar 62 and hold it in position.

Figures 3, 4, 7, 8:
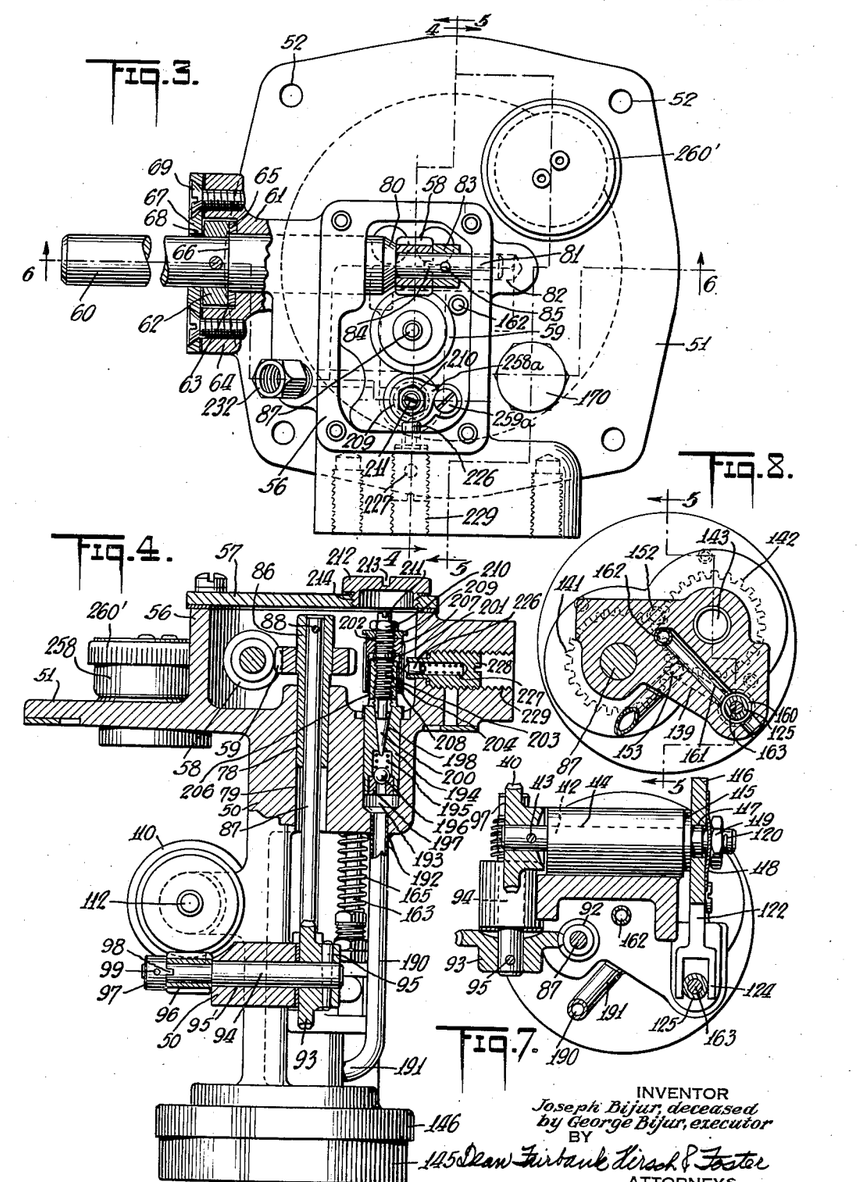
Figure 6:
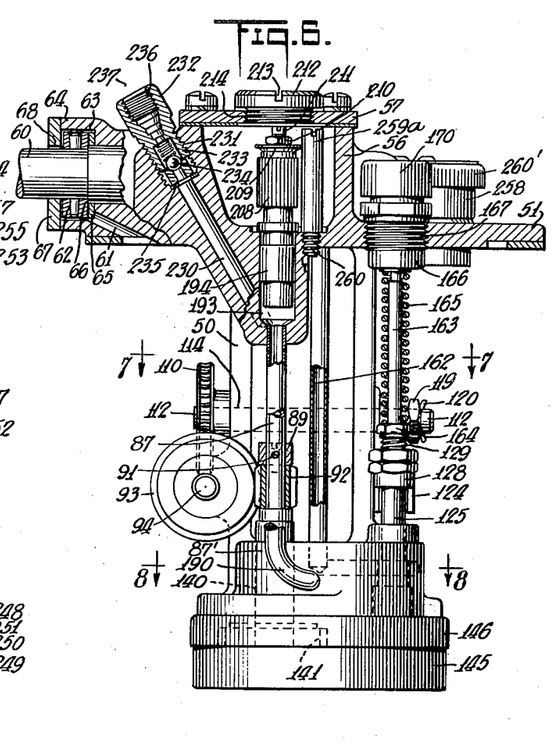

The plate cover 67 is provided with an opening 68 through which shaft 60 passes. The cover 67 is attached to the flanged portion 64 of the neck 61 by the screws 69.

The shaft 60 (see Fig. 3) is also provided with a beveled shoulder 80 and with an extension 81 which fits in the socket 82. The socket 82 serves as a guide bearing for the inner end of said shaft 60. The spiral gear 58 is held in position by the collar 83 which has a key 84 extending into an indentation in the side of the spiral gear, said collar being pinned to the shaft at 85.

The other spiral gear 59 (see Figs. 3 and 4) is press-fitted onto a sleeve 86 which is pinned to the vertical shaft 87 at 88. The shaft 87 extends through the cylindrical opening 79 in the body 50 and the downward extending skirt 78 of the sleeve 86 bears in the upper portion of said cylindrical opening 79. The lower end of the vertical shaft 87 carries a worm 92 (see also Figs. 6 and 7) which is fixed in position thereupon by the collar 89 having a key (not shown) projecting into an indentation in the end of the worm 98, a pin 91 serving to fix said collar 89 to the shaft 87.

The worm 92 drives the wheel 93 which is pinned to the shaft 94 at 95 (see Figs. 4 and 7), the shaft 94 bears in the cylindrical opening 95' in the body 50 and carries at its other end the worm 96 which is fixed in position on the shaft by the collar 97. This collar is keyed to the worm 96 at 98 and pinned to the shaft at 99.

The worm 96 drives the wheel 110 (see particularly Figs. 4, 6 and 7) which wheel is pinned to the shaft 112 at 113, said shaft passing through a cylindrical opening 114 in the body 50 and bearing within said opening. The other end of the shaft 112 is flanged at 115, said flange resting against the corresponding end of the opening 114 and carrying a cam 116 which is held in position on the opposite flats 117 of the shaft by means of the leaf spring 118 and the nut 119. The nut 119 is fixed in position by the split pin 120.

Cooperating with the cam 116, which, as shown, is provided with an indentation or depression 121 (see particularly Figs. 5, 6 and 7), is the follower lever 122. The lever is provided with the projection 123 adapted to cooperate with said depression 121 in the cam 116. The follower lever 121 is pivoted at 123' and is forked at 124 to embrace the sleeve 125 fitting on the shaft 163. The upper rounded faces 127 of the fork contact with the lower face of the nut 128 which nut is locked in position upon the upper threaded portion 129 of the sleeve 125. The sleeve 125 slides within the cylindrical opening in the body 50 and presses down upon the ball check or valve 130, which check or valve serves to control the flow from the pump into the distributing system.

The shaft 87 beyond the worm 92 drives the stud 87' which extends downwardly through the cylindrical opening 140 in the body 55 (see particularly Figs. 5, 6 and 8) and drives the gear 141 which in turn drives the gear 142, these two gears constituting the pump. The gear 142 is fixed to the stub shaft 143 which bears within the socket 144 in the body 50.

The filter unit 145, which cleanses the oil passing into the gear pump 141—142, is attached to the flanged portion 146 at the bottom of the body 50 and has a socket 147 containing the filter or felt pad 148 backed by the screens 149 and 150, the screen 150 being provided with the ridges 150 to support it in spaced relation to the bottom of the socket 147. The entrance edge of the filter is held in position by the annulus or ring 151 and the snap ring 152'.

The lubricant after passage through the filter unit 145 enters the inlet opening or port 152 (see particularly Fig. 8), is carried by the gears 141 and 142 and is forced out through the outlet opening or port 153. The outlet opening or port (see also Fig. 5) leads to the peripheral groove 154 in the valve block 155 inserted in the socket 156 in the bottom of the body 50. The block 155 is provided with the radial passages 157 which communicate with the axial bore 158, the upper end of said axial bore being formed as a valve seat at 159 for the valve 130.

When the valve 130 is lifted from its seat, the lubricant passes into the annular space 160 from whence it flows into the bore 161 (see Figs. 6 and 8) and from said bore 161 into the vertical pipe 162. The pipe 162 overflows into the bottom of the chamber 56 in the top of the body 50.

The valve 130 may be closed by either the sleeve 125 or the stem 163. The sleeve 125 is pressed downwardly at 164 by the precompressed spring 165, the upper end of which spring reacts against the bottom of the cup 166, which cup has a threaded connection 167 to the flanged portion 51 of the body 50. The stem 163 projects upwardly through an opening 168 in the base of the cup 166 and at its upper threaded portion 169 receives the button or push plate 170 which is skirted at 171 to embrace the upper reduced extension 172 of said cup 166. The coil spring 173 around the upper end of the shaft 163 serves to maintain the button 170 in its uppermost position as indicated by the dotted lines 174.

When the valve 130 is pressed against its seat 159 either by the stem 163 or by the sleeve 125, the lubricant will flow into the pipe 190 which is attached at its ends 191 and 192 to the body 50. The outlet end of the pipe at 192 feeds into the socket 193 depending from or formed at the bottom of the chamber 56 which socket 193 receives the plug 194. The plug 194 is provided with a socket 195 which receives the spring seated valve 196 and the sleeve insert 197 forming the seat for said valve.

The upper portion of said plug is provided with a frusto-conical passage into the socket 195 (see Fig. 4), said conical passageway receiving the correspondingly conically shaped plug 200. The plug 200 is provided with the shank 201 which has upper and lower threaded portions 202 and 203 respectively, the lower threaded portion 203 passing through the tapped opening 204 in the upper extension 206 of the plug 194.

Attached to the threaded portion 202 is the inverted cup 207 which is provided with a skirt 208. The outer surface of the skirt is knurled. The skirt projects downwardly over the upper extension 206 of the plug 194. The upper face of the cup 208 is provided with a knurled facing (not shown) which cooperates with the pointer disk 209, the lower face of which is correspondingly knurled (not shown) to have a rigid connection with the cap 207. The nut 210 serves to lock the pointer disk 209 and the cap 207 together.

The upper end of the shank 201 is provided with a fillister slotted portion 211 enabling turning of the shank 201 and elevation or depression of the plug 200 in the socket respectively decreasing or increasing the restricting effect thereof.

Access is had to the fillister slot 211 by the threaded cap 212, which is also provided with a fillister slot 213. The cap 212 fits into the tapped opening 214 in the cover 57 of the pocket 56.

The cap 207 is retained in position by the spring pressed pointer 226, which pointer slides in the elongated cylindrical socket 227 provided in plug 228 threaded into socket 229.

The lubricant may also flow from the pipe 190 into the bore 230 in the upper part of the body 50 (see Fig. 6), the upper end of which bore is enlarged and tapped at 231 to receive the valve casing 232. The casing 232 is provided with a socket 233 receiving the spring seated ball check 234, into the outer end of which socket is press-fitted the sleeve 235, the inner end of which is formed into a valve seat. The tapped socket 236 in the valve casing 232 serves to permit connection of the conduit system 9 leading to the bearings of the machine to be lubricated.

Although the squared flanged portion 51 may serve to connect the pump unit, and suspend it, within any suitable receptacle and/or pocket, crevice, or depression in the machine to be lubricated, adapted to serve as a lubricant reservoir, a convenient receptacle is here shown (see Fig. 6). The receptacle 55 is of general cubical shape and is provided with the bosses 245 which have the tapped sockets 246 serving for convenient attachment to the machine to be lubricated.

One side of the tank is provided with an indentation 247, in the lower portion of which is formed the socket 248. The lower end of the socket 248 communicates with the bottom of the reservoir by the bore 249. Placed in the socket 248 is the sleeve 250 around which is positioned a gasket 251. The gasket 251 contacts with the lower end of a glass cylinder 252 which extends upwardly to the tapped opening 253 in the top of the reservoir. The upper end of the glass tube 252 is received in a cap 254. The skirt 255 of the cap 254 is threaded into the tapped opening 253. The socket of the cap 254 receives the compressed spring 256, said spring 256 pressing against the ring 257 and against the top of the glass cylinder 252.

The reservoir may be conveniently filled through the cylinder 258 which passes downwardly through the flanged portion 51. The cylinder 258 has a depending skirt 259 preferably extending below the level of the top of the glass cylinder 252 and a snap cover 260' which may be removed for filling and thereafter replaced.

In operation the shaft 60 may be connected to a power source automatically actuated upon initiation of the operation of the machine. The shaft 60 drives the spiral gears 58 and 59 and the shaft 87. The shaft 87 directly drives the gear 141 of the gear pump, the other gear 142 meshing with the gear 141 being driven thereby. The gear pump will suck lubricant through the filter pad 148 into the inlet opening or port 152 and force it outwardly through the outlet port 153.

When the valve 130 is pressed against its valve seat by the spring 165, acting through the sleeve 125, the lubricant will flow from the port 153 through the oblique passage 139 to the pipe 190 and then to the socket 193. From this socket part of the lubricant will flow to the bore 230 past the spring seated outlet valve 234 to the distributing system 7—8—9—10. The other portion of the lubricant will flow past the spring seated ball check 196, the conical valve 198—200 into the cup 56 from whence it will drain back into the reservoir.

The shaft 87 also drives the cam 116 through the worm and wheel combinations 92—93 and 96—110. In Fig. 5, the follower lobe 123 is shown resting in the depression 121 in the cam 116. In this position the face 127 of the fork 124 at the other end of the lever will permit the spring 165 to actuate the sleeve 125 to press the ball 130 against the seat 159.

Normally, however, the follower lobe 123 will contact with the elevated surface of the cam 116, lifting the nut 128 and the sleeve 125. When the sleeve 125 is elevated the ball check 130 will be lifted from its seat, and the lubricant will flow through a substantially unrestricted passage by the annular space 160, the bore 161, the pipe 162 to the pocket 56 from whence it drains back to the reservoir. In this case substantially no lubricant will flow into the highly restricted distributing system.

This constant overflow and drainage of lubricant will assure adequate lubrication of the spiral gears 58 and 59 and the worms and wheels 92, 93, 96 and 110, as well as the other bearings of the actuating mechanism.

Since the gear pump 141—142 is driven at a substantially constant speed during operation of the machine, the gear pump will tend to deliver a constant volume of lubricant per unit time. If the temperature falls, particularly in the case of machines positioned in unheated plants or out of doors, or if the viscosity of lubricant increases due to some other reason, it would become desirable to increase the rate of flow of the lubricant into the distributing line. The amount of lubricant distributed into the conduit system may be conveniently regulated by the adjustable restriction 198—200.

The pointer or projection 258a on the dial 209 is stopped by the post 259a which has a threaded connection at 260 to the base of the chamber 56. Ordinarily the adjustable restriction 198—200 is set for a certain range of delivery. The delivery may be varied over this range by manipulation of the shank 201 with a screw driver through the fillister slot 211. When the adjustable restriction 198—200 has been so set, the pointer 258a is advantageously positioned opposite the post 259a, so that the supply of lubricant may be decreased or increased by rotation of the shank 201 in either direction until the stop 258a contacts with the post 259a. The increase or decrease of the restriction will depend upon the pitch of the threads 203.

If another range of adjustment is desired, the nut 210 may be loosened, the position of the knurled disk 209 changed in respect to the cap 207. Then the nut 210 is again placed into position to cause a rigid connection between the knurled upper and lower faces respectively (not shown) of the cup 207 and the disk 209.

The spring pressed retainer 226 will retain the cup 207 in position and prevent movement thereof except by manipulation with a screw driver.

The adjustable restriction 198—200 may also be regulated to decrease the pressure upon the distributing system in the case of increasing atmospheric temperature and/or decreasing lubricant viscosities. It may also be utilized for increasing the supply of lubricant upon an increase in the number of flow metering outlets and bearings lubricated thereby, and decreasing the supply of lubricant upon a decrease in the number of flow metering outlets and bearings lubricated thereby. Similarly, the total amount of lubricant supplied may be readily increased or decreased for other reasons. The adjustable restriction 198—200 is connected in parallel with the flow metering outlets supplying the bearings, but if desired, with suitable modification might be connected in series with said outlets.

Often upon initiation of the machine, or to test any one or all of the flow metering outlets to determine whether or not they are supplying lubricant, it is desirable to obtain continuous lubricant flow. This may be conveniently accomplished by pressing down the button 170, whereupon the stem 163 will serve to force the valve 130 against its seat 159. Accordingly the gear pump 141—142 will force lubricant direct into the distributing lines until such time as the button 170 is released. This will ordinarily force excessive quantities of lubricant into the line and when the suitable flooding has been obtained or tests been made, the button 170 may be released and the mechanism restored to normal operating condition.

The cam 116 is shown as having a single depression 121, but if desired, cams may be utilized with any suitable number of depressions and with any desirable arrangement of such depressions both in position and width so that any desired degree of intermittency of lubricant fed may be obtained. The can 116 may be readily removed and replaced by one or another shape by removing the split pin 120, the nut 119 and the leaf spring 118. The cam might also be so arranged as to insure a substantially continuous feed to the bearings throughout operation of the machine. In such case the feed should be so slow as to supply the bearings with just sufficient lubricant for their needs.

If, however, excessive quantities of lubricant are supplied, receivers are preferably associated with each bearing, or the bearing structure is enclosed to feed back such excessive quantities of lubricants to the reservoir for reuse. Preferably in case of such return additional filtering facilities are provided to prevent too great an accumulation of dirt in the lubricant reservoir, such filtering facilities being desirably positioned to treat the lubricant returning to the tank before it flows into the same.

Initial adjustment may be made by causing the follower lobe 123 to fit into the depression 121, whereupon the flattened surface 260 on the top of the follower lever will contact with the circular surface 261 of the cam 116 (see Fig. 5). In this position the nut 128 is screwed down until it just barely contacts with the rounded portions 127 at the top of the fork 124. Then the lock nut 129 is screwed into position. This adjustment will assure seating of the valve upon movement of the follower lobe 123 into the depression 121.

While the various elements of the lubricant supply unit may be made in such proportions, dimensions or of such design suited to the particular use to which the lubricating installation is to be put, the application of the device to most machinery render certain dimensions and proportions peculiarly suitable for universal application. For this purpose the gears 141 and 142 of the gear pump may be 1" in diameter having 32 teeth with 32 pitch; the shaft 60 may be driven between 125 to 200 R. P. M. by any suitable motor or pulley arrangement; the spiral gears 58 and 59 may have a 1 to 1 relation, while the worm combinations 92—93 and 96—110 may have a 50 to 1 reduction in each case. The maximum pressure of the spring 165 may vary conveniently between 125 to 175 lbs. The pitch and character of the thread 203 is desirably such that a half turn of the plug 200 will result in a 50% increase or a 50% decrease in the supply of lubricant.

It will be noted that the bearings may be at any diversity of levels, and yet no syphoning or leakage from a higher to a lower bearing, or from the main or header back into the pump can occur. The pipe line from the pump to the various outlets remains filled with the incompressible lubricant at all times, so that upon application of pressure to the head of the pipe line, all of the bearings, whether at high or low level, in proximity to or removed from the source of pressure, are reliably supplied with lubricant.

The check valves 33 at the various outlets, as well as the valve 234, at the head of the pipe line, assures that the line at all times will remain filled with lubricant. Pressure is therefore effectively transmitted in all cases through a substantially incompressible column of liquid to each of the restriction outlet fittings and the irregularities which would ensue were air permitted to enter into the pipe line are wholly eliminated. The restriction outlets in themselves are controlling of the relative rates of discharge substantially regardless of the lengths of the pipe line intervening therebetween and the pump, and the resistance of the bearings.

The system will at no time become clogged with dirt or dust since the filter 145 prevents the entry of any dirt into the tank and the strainers 25 in the outlets intercept any scale or chips entrained with the oil on its way to the bearings. The finely restricted outlets maintain their original setting and require no separate adjustment throughout operation. They will not become clogged since, as noted, no dirt or dust can reach them. It will be noted that lubricant of substantially any degree of viscosity can be used, with suitable adjustment of the valve or restriction 198—200.

Should it be desired to replace an outlet fitting, this can be done without in any way disturbing the system, as any such fitting may be removed from the bearing without likelihood of any substantial loss from the line, since all the other valves and outlets remain closed to prevent the entry of air into the line. The entry of air would be a pre-requisite with small bore pipe as is preferably utilized (as for example of ⅛" bore), before lubricant would leak from the single opening temporarily effected during such replacement.

While the drawings show but one type of installation, it will be understood that the invention is applicable to even the most extensive factory installation, a single pump being suitable for supplying any number of bearings throughout a building. It will be understood that while I prefer to drive the pump from the lubricated mechanism, it may be driven in any other manner, which would permit normal discharge whenever the mechanism should be lubricated.

In the application of the system to a machine which includes any bearings that move bodily in operation, such bearings are supplied by a length of seamless metal pipe, preferably coiled into a helix adjacent the hinging point substantially as shown and described in Patents 1,845,826 and 1,845,827 or by flexible hoses. The flow control outlets may be of the drip plug type of Fig. 2 or as shown in Patents 1,632,772, 1,734,026 and 1,734,027. If desired measuring valves may also be provided, replacing the drip plugs in part or whole, with suitable provision to assure return of the valves and relief of pressure in the lines, as by restricted returns or outlets.

The present application is a continuation in part of application Serial No. 566,705, filed October 3, 1931, which in turn is a division of application Serial No. 33,387, filed May 28, 1925. The present application has in common with said applications among many things a drip plug system applicable generally to industrial machinery in which there is a continuously operating gear pump, the outlet of which is provided with an unobstructed return to the pump reservoir. This return is periodically closed to create a pressure impulse in the distributing system at the desired intervals, to cause emission through the drip plugs to the bearings.

What is claimed is:

1. A lubricating installation for mechanical apparatus comprising a pipe line having a multiplicity of flow controlling outlets at various levels leading in parallel to bearings of the mechanism at different levels, and being provided with means to emit at predetermined relative rates responsive to pressure on the pipe line and for the duration of said pressure, a pump provided with a conduit connection to said pipe line, the flow through which conduit connection and from said conduit connection into and through said pipe line is obstructed by said flow controlling outlets and said pump being also provided with a relatively unobstructed outlet, said pump being caused periodically by closure of said outlet after a predetermined number of cycles of operation of the apparatus, to apply said pressure in order to effect said emission, means to prevent the pipe line from being drained during the intervals between pump operations and means to effect a continuous discharge of said pump into said pipe line, the means for effecting periodic supply being rendered ineffective to cause periodic supply when said means to effect a continuous supply is actuated.

2. A lubricating installation for mechanical apparatus which includes a multiplicity of bearings at various levels, said installation comprising a pipe line having a multiplicity of flow controlling outlets in parallel and at said bearings, said outlets constructed and arranged to emit at predetermined relative rates responsive to pressure applied to the pipe line and for the duration of said pressure, a pump delivering into the entrance of said pipe line, to exert pressure on the line in order to effect said emission, a check valve near the outlet of the pump and check valves at said various flow controlling outlets to cause the pipe line to remain filled with lubricant during the intervals between pump operations and an adjustable flow controlling outlet means feeding back to said pump being provided with a double adjustment, one permitting a limited regulation and the other permitting a setting of said limited regulation, said last mentioned means including an obstructed return passage to the supply having the same order of obstruction as the outlets, said obstruction exerted by said outlets and said adjustable means being tremendously greater than that of the pipe line and the bearings.

3. Mechanical apparatus comprising a multiplicity of bearings at various levels, a source of lubricant pressure, piping connecting said source with said various bearings in parallel, said piping including an inlet check valve in the line of lubricant flow near said source of pressure, and outlet check valves in the line of lubricant flow at said various flow controlling outlets to cause the pipe line to be maintained filled with lubricant during the intervals between pump operations, said source including a continuously operating pump provided with automatic means to cause said pump to feed the piping intermittently and manual non-threaded reciprocable spring-returned means which may be actuated to cause said pump to feed the piping continuously.

4. Mechanical apparatus comprising a multiplicity of bearings at various levels, a source of lubricant pressure with an unobstructed outlet, piping connecting said source with said various bearings in parallel, said source being also provided with an outlet to said piping and said piping including a check valve near said source of pressure, check valves at said various flow controlling outlets to cause the pipe line to be maintained filled with lubricant during the intervals between pump operations, means controlled from the operating mechanism for periodically rendering the source of pressure effective for lubrication during a relatively short interval by closing said unobstructed outlet with intervening relatively long periods in which lubricant propelling pressure is not applied to the pipe line and means which may be actuated to effect a continuous lubricant pressure discharge into said piping.

5. In a mechanical installation, in combination, a multiplicity of bearings, a pipe line having flow controlling outlets leading to said bearings, a reservoir a continuously operating pump normally caused to discharge into said reservoir without exerting lubricant pressure on the pipe line and set into action periodically after a predetermined number of cycles of operation of the installation for exerting lubricant pressure at the head of the pipe line to effect emission to said bearings, said outlets imposing a resistance so high as to decrease the discharge of the pump and substantially sustain said pressure, a chain of gearing driven from said installation and driving said pump and pipe means through which said pump delivers lubricant to said gearing during the intervals between emission to the bearings, said pump being cut off from said pipe means during emission to the bearings.

6. In a mechanical installation, in combination, a multiplicity of bearings, a pipe line having outlets with flow controlling restrictions leading to said bearings, means set into action periodically after a predetermined number of cycles of operation of the installation for discharging lubricant under pressure into the pipe line, and sustaining pressure thereon until a corresponding volume has been emitted through the various restricted outlets, replaceable cam means to regulate the periods between discharges, means to rotate said cam means, and regulator means to control the periodic action of said first mentioned means actuated in turn by said cam means.

7. In a mechanical installation, in combination, a multiplicity of bearings, a pipe line having outlets with flow controlling restrictions leading to said bearings, means maintaining the pipe line filled with lubricant, and means set into action periodically after a predetermined number of cycles of operation of the installation, to force lubricant into the head of the pipe line, under a sustained pressure and means to regulate said pressure at said source.

8. In a mechanical installation, in combination, a multiplicity of bearings, a pipe line having outlets with flow controlling restrictions leading to said bearings, a source of lubricant pressure connected to the inlet to the pipe line, means maintaining the pipe line filled with lubricant, from said inlet substantially to said restricted outlets, and means set into action periodically after a predetermined number of cycles of operation of the installation to force lubricant into the head of the pipe line, under a sustained pressure, said last mentioned means including a train of gearing, a cam driven thereby, a low resistance outlet other than said connection to the pipe line from said pump feeding lubricant to said train, a valve on said outlet to close the same and thereupon cause forcing of lubricant into the pipe line and a follower actuated by said cam to close said valve and said outlet.

9. In a lubricating installation, in combination, a lubricant tank, a pump supplied therefrom, a pipe line supplied from said pump and having a multiplicity of outlets leading to the bearings to be lubricated, means to cause discharge of said pump during the operation of the installation to be lubricated into said pipe line, said means being effective after a predetermined number of cycles of operation of the mechanism, said pipe line having highly restricted outlets leading to said bearings to govern the distribution among the bearings of the charge ejected from the pipe line, and said last mentioned means including a low restriction outlet for said pump to said tank, a valve on said outlet to close off the same, and automatic means to close said valve, said installation being also provided with manual means to close said valve.

10. In a machine installation, in combination, a plurality of bearings, a lubricant pipe system having outlets in parallel delivering to the bearings, flow control fittings in said outlets to determine the division of lubricant from said pipe line to said bearings, a pump having an outlet delivering to the head of said pipe line, means actuated from said installation furnishing the energy for operating said pump, said means including spiral gears, worms, and worm wheels driven therefrom, a cam connected to the last one of said worm wheels, a follower for said cam, a low resistance outlet from said pump feeding lubricant to said spiral gears, worms and worm wheels, and a valve for closing off said outlet actuated by said follower, closure of said valve causing feeding of said pipe system.

11. A lubricant distributing system comprising a series of rotating reciprocating parts, a series of fixed parts contacting with said first mentioned parts to form bearings for said moving parts, a series of small lubricant conduits for dispensing lubricant to the places of contact between said moving parts and said fixed parts, the outlets of said conduits being attached to said fixed parts adjacent their place of contact with said moving parts, a series of restrictions positioned in said conduits to limit dispensation of the oil from said outlets, main conduits to supply said first mentioned conduits and means for forcing lubricant into said main conduits, said last mentioned means being actuated directly by at least one of said parts, and including automatic means to give an intermittent feed and manual means to give a continuous feed said automatic means including a valve-controlled, normally-unobstructed lubricant return and said automatic and manual means when actuated serving to close said valve to cause forcing of lubricant into said conduits and to cause said dispensation.

12. A lubricant distributing system comprising a series of rotating and reciprocating parts, a series of fixed parts contacting with said first mentioned parts, to form bearings for said moving parts, a series of small lubricant conduits for dispensing lubricant to the places of contact between said moving parts and said fixed parts, the outlets of said conduits being attached to said fixed parts adjacent their place of contact with said moving parts, a series of restrictions positioned in said conduits to limit dispensation of the oil from said outlets, main conduits to supply said first mentioned conduits, means for forcing lubricant into said conduits, means for intermittently actuating said last mentioned means which is in turn actuated periodically by at least one of said parts upon completion of a predetermined number of cycles of operation and manual means for regulating rate of the lubricant discharge and the pressure thereof in said main conduits and for effecting an optional continuous discharge of lubricant thereinto.

13. A lubricant distributing system comprising a series of rotating and reciprocating parts, a series of fixed parts contacting with said first mentioned parts, to form bearings for said moving parts, a series of small lubricant conduits for dispensing lubricant to the places of contact between said moving parts and said fixed parts, the outlets of said conduits being attached to said fixed parts adjacent their place of contact with said moving parts, a series of restrictions positioned in said conduits to permit only slow movement of oil through said conduits and slow dispensation of the oil from said outlets, main conduits adapted to supply said first mentioned conduits, means having a flow connection to said conduits for forcing lubricant into said conduits, means for actuating said forcing means and means to maintain said conduits full of lubricant when lubricant is not being forced into said conduits, said forcing means including a gear pump provided with an open outlet which is unobstructed and also provided with a flow connection to said conduits and a valve periodically actuated to close said outlet, whereby said pump will force lubricant into said conduits, said actuating means including a gear train and said maintaining means including spring seated valves at the inlet and outlet ends of said conduits.

14. A lubricant distributing system comprising a series of rotating and reciprocating parts, a series of fixed parts contacting with said first mentioned parts, forming bearings for said moving parts, a series of small lubricant conduits for dispensing lubricant to the places of contact between said moving parts and said fixed parts, the outlets of said conduits being attached to said fixed parts adjacent their place of contact with said moving parts, a series of restrictions positioned in said conduits to limit dispensation of the oil from said outlets, main conduits to supply said first mentioned conduits, means for causing a movement of the lubricant toward said outlets periodically after a predetermined number of cycles of operation of said moving parts and means for maintaining the lubricant in substantially quiescent condition during the remaining number of cycles, the last mentioned number being substantially greater in number than the first mentioned number and manual means for optionally effecting said movement of lubricant during said quiescent period, said means causing said movement being provided with an unobstructed outlet which is in turn provided with a valve control, said valve control closing said outlet to cause periodic movement of the lubricant.

15. A lubricant distributing system comprising a series of rotating and reciprocating parts, a series of fixed parts contacting with said first mentioned rotating reciprocating parts, forming bearings for said moving parts, a series of small lubricant conduits for dispensing lubricant to the places of contact between said moving parts and said fixed parts, the outlets of said conduits being attached to said fixed parts adjacent their place of contact with said moving parts, a series of restrictions positioned in said conduits adapted to permit only slow movement of oil through said conduits and slow dispensation of the oil from said outlets, main conduits adapted to supply said first mentioned conduits, and means for forcing lubricant through said conduits toward said outlets, said forcing means being so proportioned to said restrictions and to the rate of said moving parts that no substantial amount of lubricant will pass said contacting surfaces to waste and manual means for optionally causing such waste, said forcing means being continuously operated and being provided with an outlet to said conduits and with another unobstructed outlet, which latter is periodically closed to cause forcing of lubricant through said conduits, substantially no lubricant being forced into said system when the valve is opened.

16. A lubricating installation for a machine with a plurality of spaced bearings including a pump, three parallel conduit systems supplied from said pump, one of which leads to said bearings and the other two of which return lubricant to said reservoir, the system leading to the bearings being highly restricted and one of the other systems being provided with an adjustable restriction and the other of said other systems being provided with a valve to close off said system, said valve being normally in open position, and means to actuate said valve to closed position, said last mentioned means being provided with manual and automatic actuating devices.

17. A lubricating installation for a machine with a plurality of spaced bearings including a pump, three parallel conduit systems supplied from said pump, one of which leads to said bearings and the other two of which return lubricant to said reservoir, the system leading to the bearings being highly restricted and one of the other systems being provided with an adjustable restriction and the other of said other systems being provided with a valve to close off said system, said valve being normally in open position, and means to actuate said valve to closed position, said valved system normally affording an unrestricted discharge for said pump back into said reservoir, whereby said valved system will receive substantially all of the discharge of said pump during the periods when said valve is open.

18. A lubricating installation for a machine with a plurality of spaced bearings including a pump, three parallel conduit systems supplied from said pump, one of which leads to said bearings and the other two of which return lubricant to said reservoir, the system leading to the bearings being highly restricted and one of the other systems being provided with an adjustable restriction and the other of said other systems being provided with a valve to close off said system, said valve being normally in open position and means to actuate said valve to closed position, said last mentioned means including a train of reduction gearing from said machine, a cam and follower combination driven by said gearing, and means actuated by said follower to close said valve.

19. A lubricating installation for a machine with a plurality of spaced bearings including a pump, three parallel conduit systems supplied from said pump, one of which leads to said bearings and the other two of which return lubricant to said reservoir, the system leading to the bearings being highly restricted and one of the other systems being provided with an adjustable restriction and the other of said other systems being provided with a valve to close off said system, said valve being normally in open position, and means to actuate said valve to closed position, said last mentioned means being driven by a train of gearing from said machine and said valved system serving to feed lubricant to said train.

20. A lubricating installation for a machine having a plurality of bearings requiring relatively large amounts of lubrication and another plurality of bearings requiring relatively small amounts of lubrication, said installation including a plurality of distributing conduits supplying said bearings, a pump supplying said conduits, a lubricant reservoir supplying said pump, a plurality of means to obstruct and limit the flow toward said second plurality of bearings through the respective conduits leading thereto, means to actuate said pump from said machine, said actuating means including said first mentioned plurality of bearings and means periodically actuated to cut off the conduits leading to said first mentioned bearings.

21. A lubricating installation for a machine having a plurality of bearings requiring relatively large amounts of lubrication and another plurality of bearings requiring relatively small amounts of lubrication, said installation including a plurality of distributing conduits supplying said bearings, a pump supplying said conduits, a lubricant reservoir supplying said pump, a plurality of means to obstruct and limit the flow toward said second plurality of bearings through the respective conduits leading thereto, means to actuate said pump from said machine, said conduits leading to said first plurality of bearings being substantially unrestricted whereby substantially all the discharge of the pump will flow therethrough and means for periodically cutting off said unrestricted conduits, whereby the discharge from said pump will be caused to flow to said second plurality of bearings.

22. A lubricating installation for a machine having a plurality of spaced bearings, said installation including a central lubricant reservoir, a central pump supplied from said reservoir, a plurality of distributing conduits leading from said pump to said bearings, the conduits leading to some of said bearings being provided with flow metering obstructing means and the other bearings being provided with a return to drain the lubricant back to the reservoir, means to actuate said pump from said machine, and a by-pass provided with an open adjustable restriction to permit part of the discharge of said pump to return to said reservoir said adjustable restriction regulating the pressure at which the pump discharges into said plurality of conduits leading to the bearings provided with the flow metering means.

23. A lubricating installation for a machine having a plurality of spaced bearings, said installation including a central lubricant reservoir, a central pump supplied from said reservoir, a plurality of distributing conduits leading from said pump to said bearings, the conduits leading to some of said bearings being provided with flow metering obstructing means and the other bearings being provided with a return to drain the lubricant back to the reservoir, means to actuate said pump from said machine, and means periodically to prevent flow of lubricant to the bearings provided with the return.

24. A lubricant distributing installation for a plurality of bearings comprising a lubricant reservoir, a gear pump immersed therein and receiving lubricant therefrom, an unrestricted return from the discharge side of said pump to the reservoir, a restricted return in parallel therewith, a distributing system from the pump to the bearings, said system being provided with drip plug outlets and means for cutting off said unrestricted return and causing said pump to discharge into said system.

25. In combination with a mechanism having a plurality of spaced bearings and a lubricant receiving reservoir, a lubricant installation comprising a branched distributing piping system leading to said bearings and a supply unit comprising a cover element to be applied to said reservoir, a cup-shaped element on said cover element, a depending support from said cover element, a pump carried at the lower part of said support and a driving mechanism for said pump enclosed in said cup and means to cause said pump alternately to feed into said cup to lubricate said driving mechanism and to feed into said system to lubricate said bearings.

26. In a lubricating installation, in combination, a distributing piping system with obstructed metering outlets to the bearings to be lubricated and a source of lubricant supply comprising a unit including a reservoir, a pump in said reservoir, an inlet to said system, restricted and unrestricted by-passes from said pump to said reservoir, said unrestricted by-pass being provided with an automatically actuated valve to close said by-pass periodically, said closing by said valve of said unrestricted by-pass causing said pump to deliver lubricant under a relatively high pressure to said piping system, and said restricted by-pass regulating the volume and pressure of said delivery.

27. In a lubricating installation, in combination, a plurality of bearings to be lubricated, a distributing piping system supplying said bearings, and a source of lubricant supply therefor comprising a supply structure including a reservoir, a gear pump in said reservoir adjacent the bottom thereof, an unrestricted return passage from said pump to said reservoir, actuating mechanism for said pump adjacent the top of said reservoir and means to periodically close said unrestricted return to cause feed to said system, said return when opened serving to feed lubricant to said actuating mechanism.

28. In a lubricating installation for a plurality of bearings, in combination, a distributing piping system feeding said bearings, and a source of lubricant supply connected to the inlet thereof, said source of lubricant supply including a supply structure comprising a reservoir, a gear pump immersed in the lower part of said reservoir, an unrestricted return passage from said pump to said reservoir provided with a valve, means for periodically closing said valve to cut off said unrestricted return passage to cause feed into said system and to said bearings, and an actuating mechanism for said pump and said means extending from the upper part of said reservoir to the pump and to said means, said return passage when not cut off serving to feed lubricant to said actuating mechanism.

29. In a lubricating installation for a mechanism provided with a lubricant-containing pocket and a plurality of spaced bearings, a branched distributing piping system leading to said bearings, and a pump mechanism driven from the installation, said pump mechanism including a cover with an enclosure element, an actuating mechanism in said enclosure, a depending driving mechanism connected to said actuating mechanism and moving pump elements adjacent the bottom of said connecting mechanism a substantial distance below said cover element, whereby said pump mechanism may be placed in said lubricant-containing pocket, said driving mechanism, said connecting mechanism and said pumping mechanism being entirely carried by said cover.

30. In a lubricating installation for mechanism provided with a plurality of spaced bearings, a branched distributing system leading to said bearings with obstructed metering outlets and a pump arrangement feeding said system and driven from said mechanism, said pump arrangement being provided with a low restriction outlet other than to said system and also being provided with means to periodically cut off such low restriction outlet and cause the pump to discharge into said system, said mechanism including a gear train to actuate said pump and said means.

31. In combination, a lubricating installation for a mechanism having a plurality of spaced bearings, a branched distributing piping system leading to said bearings and a central gear pump, said gear pump being provided with a reservoir, an open outlet to said reservoir and means for periodically cutting off said outlet to said reservoir to cause discharge into said system, said mechanism having a gearing train including a pair of spiral gears for driving said gear pump, and also including a plurality of worms and wheels and a cam and follower arrangement actuated by said spiral gears for driving said means.

32. In a lubricating installation, for a machine having a plurality of spaced bearings, a high resistance branched distributing piping system leading to said bearings, a reservoir and a pump positioned at the inlet to said system, a low resistance return from said pump to said reservoir and a valve means to cut off said return, said valve means including a valve seat in the outlet of the pump, a ball check cooperating with said valve seat, a sliding element to press said ball check against its seat, means normally retaining said sliding element out of contact with said ball check, and manual means to cause contact between said sliding element and said ball check.

33. In a lubricating installation for a machine having a plurality of spaced bearings, a relatively high resistance branched distributing piping system leading to said bearings, a reservoir and a pump positioned at the inlet to said system, a relatively low resistance return from said pump to said reservoir, and a valve means to cut off said return, said valve means including a valve seat in the outlet of the pump, a ball check cooperating with said valve seat, a sliding element to press said ball check against its seat, means to force said sliding element against said ball check to cause contact between it and its seat and automatic means to remove said sliding element from contact with said ball check.

34. In a lubricating installation for a mechanism having a plurality of spaced bearings, a lubricating installation for said bearings having a branched distributing conduit system with metering outlets leading thereto, a pump feeding said system, a reservoir supplying lubricant to said pump and a relatively unobstructed by-pass from said pump to said reservoir, said by-pass being provided with means to prevent flow therethrough, said means including a valve seat at the outlet from said pump, a valve in contact with said seat, concentric elements pressing said valve against its seat, manual means to control one of said elements and automatic means to control the other of said elements.

35. In a centralized lubricating installation for a mechanism having a plurality of spaced and distributed bearings to be supplied with relatively minute yet accurately proportioned quantities of lubricant, a central reservoir, a cover therefor, a central pump fed from said reservoir, a distributing piping system with an inlet from said pump and a plurality of outlets to said bearings, each outlet being provided with a metering device, and an additional outlet returning lubricant to the reservoir, said pump being provided with an actuating mechanism, said pump and actuator being entirely carried by said cover and said additional outlet being also carried entirely by said cover and supplying lubricant to said actuating mechanism.

36. In a centralized lubricating installation for a mechanism having a plurality of spaced and distributed bearings requiring relatively minute quantities of lubricant at intervals during operation of the mechanism and also requiring relatively large quantities of lubricant for testing or upon initiation of operation, said installation including a central reservoir, a central pump receiving lubricant from said reservoir, a drive for said pump deriving power continuously from said mechanism, a branched distributing conduit system having an inlet connected to the outlet of said pump and a plurality of outlets to the bearings to be lubricated, flow controlling obstructions in the line of flow to said outlets to meter the lubricant supply to each of the bearings, said conduit system also having an unobstructed additional outlet to said reservoir and automatic and manual means to close said unobstructed outlet automatically and optionally as desired.

37. In a centralized lubricating installation for a mechanism having a plurality of spaced and distributed bearings requiring relatively minute quantities of lubricant at intervals during operation of the mechanism and also requiring relatively large quantities of lubricant for testing or upon initiation of operation, said installation including a central reservoir, a central pump receiving lubricant from said reservoir, a drive for said pump deriving power continuously from said mechanism, a branched distributing conduit system having an inlet connected to the outlet of said pump and a plurality of outlets to the bearings to be lubricated, flow controlling obstructions in the line of flow to said outlets to meter the lubricant supply to each of the bearings, said obstructions each including spring seated valves, means to cause said pump to discharge back into the reservoir without forcing lubricant past said outlets or exerting substantial pressure on said system and manual and automatic means for preventing such discharge and for causing said pump to exert substantial pressure on said system to cause opening of said valves and emission to the bearings.

GEORGE BIJUR.
*Executor of the Estate of Joseph Bijur, Deceased.*